US009878783B2

(12) United States Patent
Sutton et al.

(10) Patent No.: US 9,878,783 B2
(45) Date of Patent: *Jan. 30, 2018

(54) CONSTANT VELOCITY JOINT WITH SPRING RATE CONTROL MECHANISM

(71) Applicant: Bell Helicopter Textron Inc., Fort Worth, TX (US)

(72) Inventors: Drew Sutton, Watauga, TX (US); Frank B. Stamps, Colleyville, TX (US); Christopher Foskey, Keller, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 946 days.

This patent is subject to a terminal disclaimer.

(21) Appl. No.: 14/258,187

(22) Filed: Apr. 22, 2014

(65) Prior Publication Data

US 2014/0248150 A1 Sep. 4, 2014

Related U.S. Application Data

(63) Continuation-in-part of application No. 13/673,475, filed on Nov. 9, 2012, now Pat. No. 9,399,513.

(Continued)

(51) Int. Cl.
*B64C 27/41* (2006.01)
*B64C 27/32* (2006.01)
(Continued)

(52) U.S. Cl.
CPC .............. *B64C 27/41* (2013.01); *B64C 27/32* (2013.01); *F16D 3/28* (2013.01); *F16D 3/33* (2013.01); *F16D 3/30* (2013.01)

(58) Field of Classification Search
CPC ......... B64C 27/41; B64C 27/37; B64C 27/32; F16D 3/30; F16D 3/33
(Continued)

(56) References Cited

U.S. PATENT DOCUMENTS 3,517,528 A 6/1970 Eccher
3,965,700 A 6/1976 Nicoletti
(Continued)

FOREIGN PATENT DOCUMENTS

WO 2013061348 A1 5/2013

OTHER PUBLICATIONS

Communication of Allowance Under Rule 71(3) EPC in related European Application No. 13172496.5, dated Jul. 16, 2015, 32 pages.
(Continued)

*Primary Examiner* — Richard Edgar

(57) ABSTRACT

According to one embodiment, a constant velocity (CV) joint includes a first yoke, a second yoke, and three bearings. The first yoke is configured to be rotatably coupled to an input device about a first axis and configured to receive the input device through a first opening. The second yoke is rotatably coupled to the first yoke about a second axis and rotatably coupled to an output device about a third axis. The first bearing is disposed about the first axis adjacent to the first yoke, the second bearing is disposed about the second axis adjacent to the first yoke or the second yoke, and the third bearing disposed about the third axis adjacent to the second yoke. The first and third bearings torsionally constrain movement the first yoke and the second yoke so as to achieve a substantially CV characteristic between the input device and the output device.

19 Claims, 13 Drawing Sheets

Related U.S. Application Data

(60) Provisional application No. 61/906,039, filed on Nov. 19, 2013.

(51) Int. Cl.
  *F16D 3/33* (2006.01)
  *F16D 3/28* (2006.01)
  *F16D 3/30* (2006.01)

(58) Field of Classification Search
  USPC .......................................... 464/125, 126, 136
  See application file for complete search history.

(56) References Cited

U.S. PATENT DOCUMENTS

| | | | |
|---|---|---|---|
| 5,954,586 | A | 9/1999 | Kirson |
| 7,442,126 | B2 | 10/2008 | Thompson |
| 2003/0178528 | A1 | 9/2003 | Zoppitelli et al. |
| 2003/0222171 | A1* | 12/2003 | Zoppitelli ........... B64C 29/0033 244/10 |
| 2004/0106458 | A1 | 6/2004 | Thompson |
| 2008/0267778 | A1 | 10/2008 | Stamps et al. |

OTHER PUBLICATIONS

Office Action in related Chinese Application No. 201310553025.X, dated Feb. 1, 2016, 3 pages.

Notification of Grant of Patent in related Chinese Application No. 201310553025.X, dated Apr. 14, 2016, 4 pages.

Notice of Allowance in related U.S. Appl. No. 13/673,475, dated Apr. 12, 2016, 5 pages.

European Search Report in related European Application No. 13172496.5, dated Jan. 24, 2013, 3 pages.

Official Action in related European Application No. 13172496.5, dated Feb. 19, 2014, 7 pages.

Office Action in related U.S. Appl. No. 13/673,475, dated Dec. 1, 2015, 32 pages.

Office Action in related Chinese Application No. 201310553025.X, dated Jul. 30, 2015, 9 pages.

Office Action in related Canadian Application No. 2,832,784, dated Mar. 18, 2015, 4 pages.

Examination Report in related European Application No. 13172496.5, dated Dec. 8, 2014, 5 pages.

\* cited by examiner

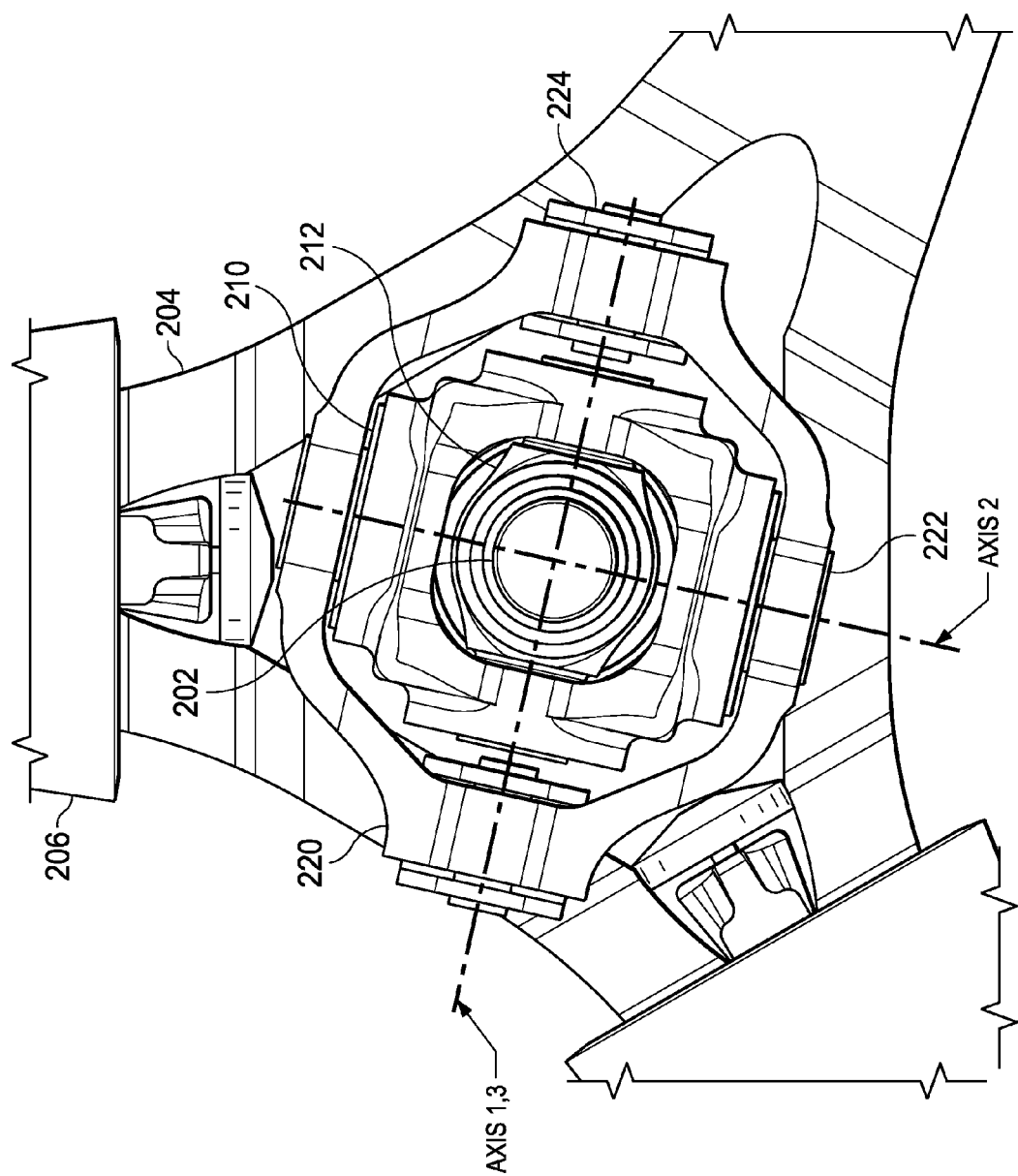

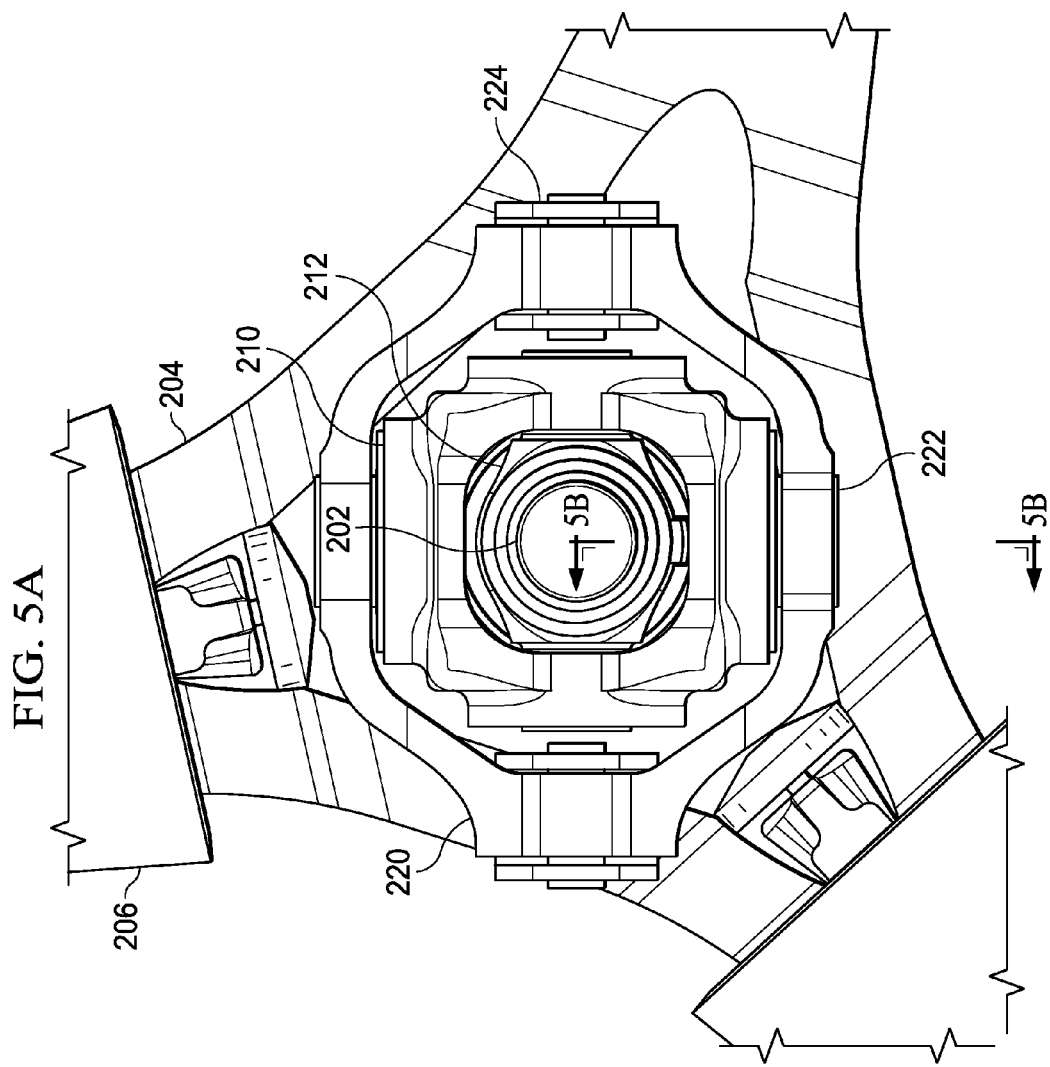

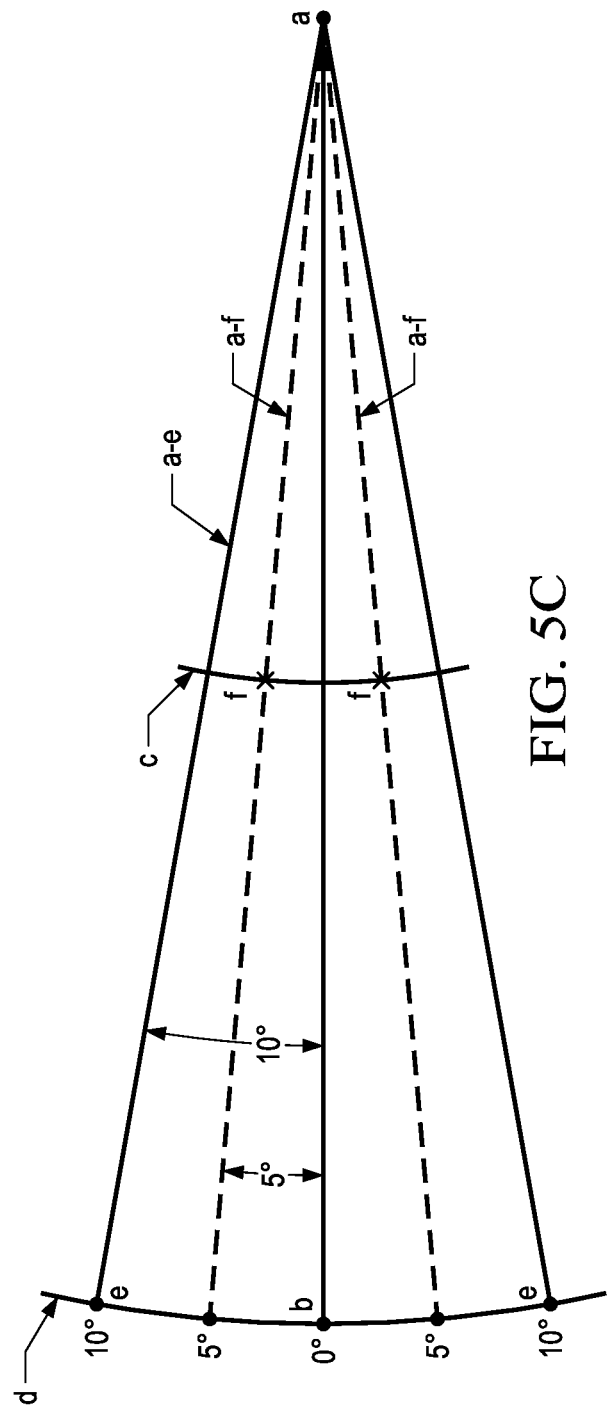

CONSTANT VELOCITY JOINT WITH SPRING RATE CONTROL MECHANISM

RELATED APPLICATIONS

Pursuant to 35 U.S.C. §119 (e), this application claims priority to U.S. Provisional Patent Application Ser. No. 61/906,039, CONSTANT VELOCITY JOINT WITH SPRING RATE CONTROL MECHANISM, filed Nov. 19, 2013. U.S. Provisional Patent Application Ser. No. 61/906,039 is hereby incorporated by reference.

Pursuant to 35 U.S.C. §120, this application is a continuation-in-part of and claims priority to U.S. patent application Ser. No. 13/673,475, CONSTANT VELOCITY JOINT WITH CONTROL MECHANISM, filed Nov. 9, 2012. U.S. patent application Ser. No. 13/673,475 is hereby incorporated by reference.

TECHNICAL FIELD

This invention relates generally to constant velocity joints, and more particularly, to a constant velocity joint with spring rate control mechanism.

BACKGROUND

A rotorcraft may include one or more rotor systems. One example of a rotorcraft rotor system is a main rotor system. A main rotor system may generate aerodynamic lift to support the weight of the rotorcraft in flight and thrust to counteract aerodynamic drag and move the rotorcraft in forward flight. Another example of a rotorcraft rotor system is a tail rotor system. A tail rotor system may generate thrust in the same direction as the main rotor system's rotation to counter the torque effect created by the main rotor system.

SUMMARY

Particular embodiments of the present disclosure may provide one or more technical advantages. A technical advantage of one embodiment may include the capability to provide a constant velocity joint. A technical advantage of one embodiment may include the capability to reduce friction and wear in a CV joint. A technical advantage of one embodiment may include the capability to reduce the number of bearings in a CV joint.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which:

FIGS. 4A-4F show disassembled views of the CV joint of FIG. 3; and

FIGS. 5A-5D show the CV joint of FIG. 3 with a control mechanism.

DETAILED DESCRIPTION OF THE DRAWINGS

Figure 1:
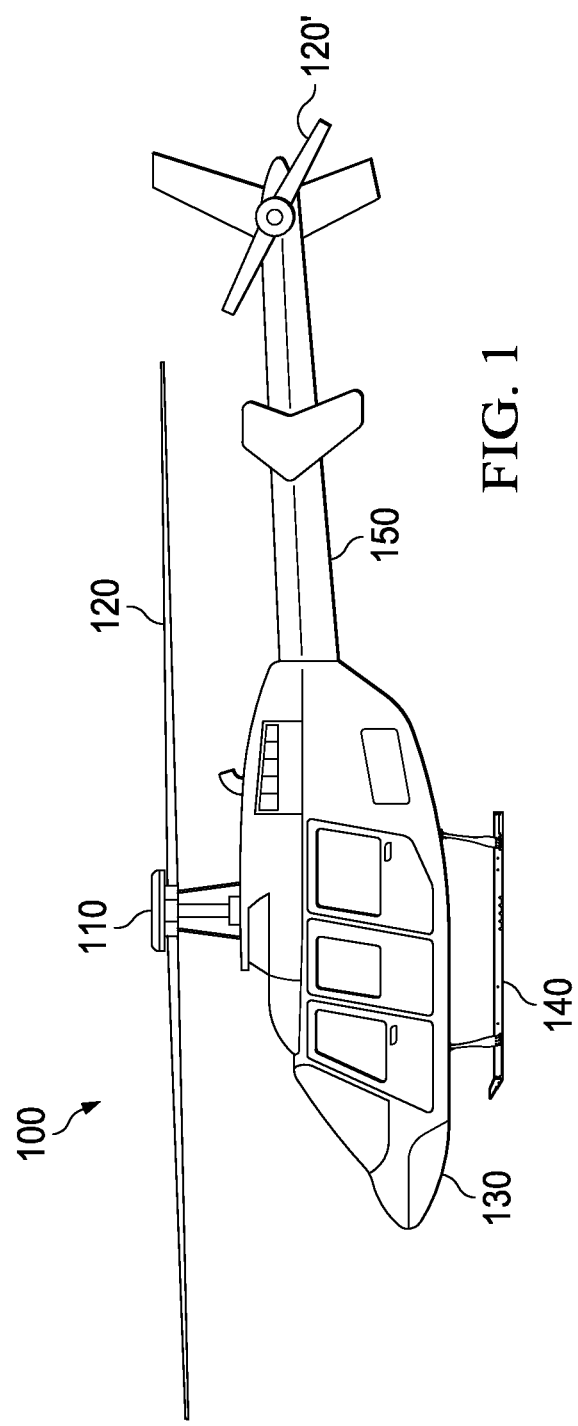
FIG. 1 shows a rotorcraft according to one example embodiment.

FIG. 1 shows a rotorcraft 100 according to one example embodiment. Rotorcraft 100 features a rotor system 110, blades 120, a fuselage 130, a landing gear 140, and an empennage 150. Rotor system 110 may rotate blades 120. Rotor system 110 may include a control system for selectively controlling the pitch of each blade 120 in order to selectively control direction, thrust, and lift of rotorcraft 100. Fuselage 130 represents the body of rotorcraft 100 and may be coupled to rotor system 110 such that rotor system 110 and blades 120 may move fuselage 130 through the air. Landing gear 140 supports rotorcraft 100 when rotorcraft 100 is landing and/or when rotorcraft 100 is at rest on the ground. Empennage 150 represents the tail section of the aircraft and features components of a rotor system 110 and blades 120'. Blades 120' may provide thrust in the same direction as the rotation of blades 120 so as to counter the torque effect created by rotor system 110 and blades 120. Teachings of certain embodiments relating to rotor systems described herein may apply to rotor system 110 and/or other rotor systems, such as other tilt rotor and helicopter rotor systems. It should also be appreciated that teachings from rotorcraft 100 may apply to aircraft other than rotorcraft, such as airplanes and unmanned aircraft, to name a few examples.

Figure 2:
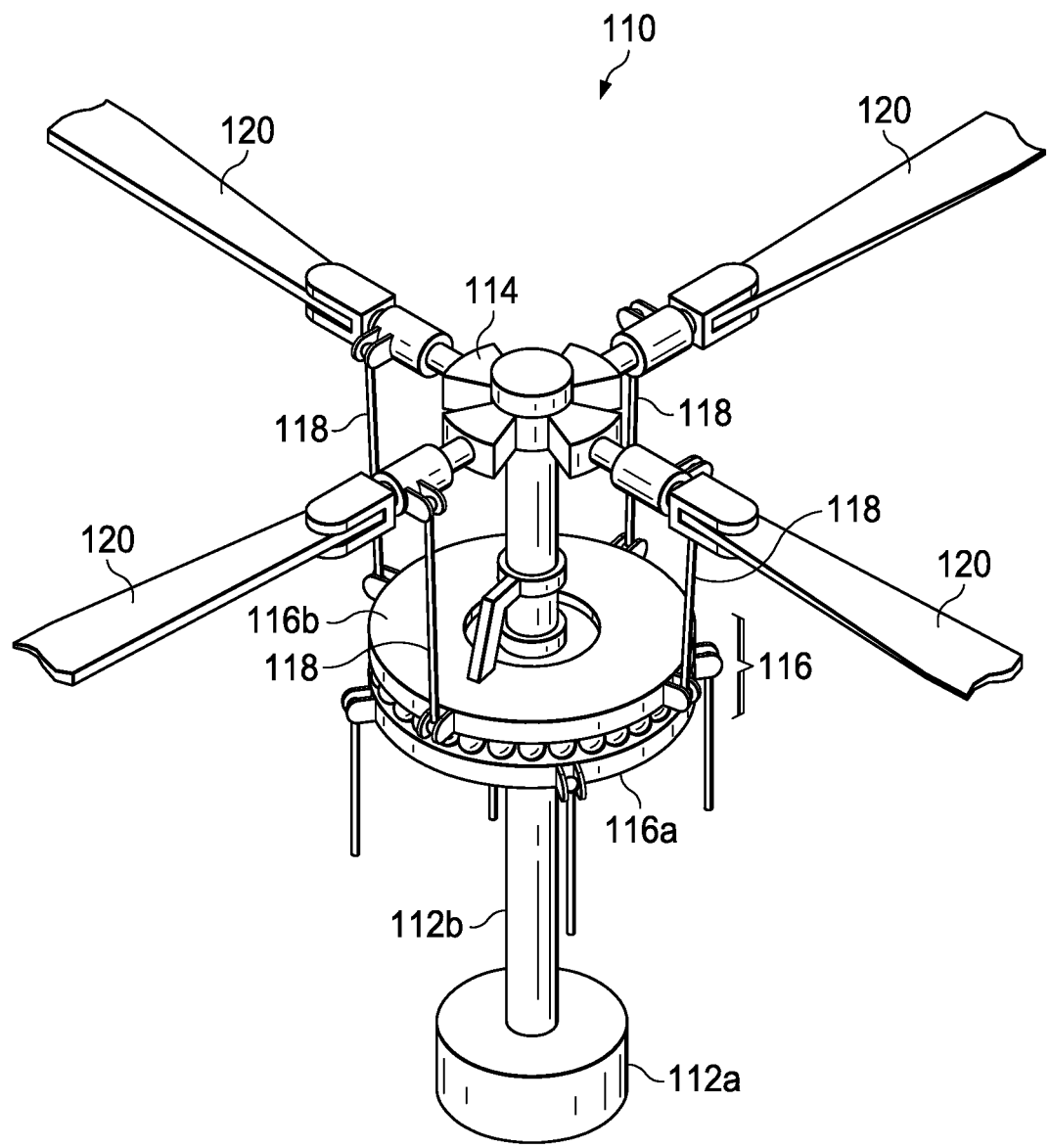
FIG. 2 shows the rotor system and blades of the rotorcraft of FIG. 1 according to one example embodiment.

FIG. 2 shows rotor system 110 and blades 120 of FIG. 1 according to one example embodiment. In the example of FIG. 2, rotor system 110 features a power train 112, a hub 114, a swashplate 116, and pitch links 118. In some examples, rotor system 110 may include more or fewer components. For example, FIG. 2 does not show components such as a gearbox, a swash plate, drive links, drive levers, and other components that may be incorporated.

Power train 112 features a power source 112a and a drive shaft 112b. Power source 112a, drive shaft 112b, and hub 114 are mechanical components for transmitting torque and/or rotation. Power train 112 may include a variety of components, including an engine, a transmission, and differentials. In operation, drive shaft 112b receives torque or rotational energy from power source 112a and rotates hub 114. Rotation of rotor hub 114 causes blades 120 to rotate about drive shaft 112b.

Swashplate 116 translates rotorcraft flight control input into motion of blades 120. Because blades 120 are typically spinning when the rotorcraft is in flight, swashplate 116 may transmit flight control input from the non-rotating fuselage to the hub 114, blades 120, and/or components coupling hub 114 to blades 120 (e.g., grips and pitch horns). References in this description to coupling between a pitch link and a hub may also include, but are not limited to, coupling between a pitch link and a blade or components coupling a hub to a blade.

In some examples, swashplate 116 may include a non-rotating swashplate ring 116a and a rotating swashplate ring 116b. Non-rotating swashplate ring 116a does not rotate with drive shaft 112b, whereas rotating swashplate ring 116b does rotate with drive shaft 112b. In the example of FIG. 2, pitch links 118 connect rotating swashplate ring 116b to blades 120.

In operation, according to one example embodiment, translating the non-rotating swashplate ring 116a along the axis of drive shaft 112b causes the pitch links 118 to move up or down. This changes the pitch angle of all blades 120 equally, increasing or decreasing the thrust of the rotor and causing the aircraft to ascend or descend. Tilting the non-rotating swashplate ring 116a causes the rotating swashplate 116b to tilt, moving the pitch links 118 up and down cyclically as they rotate with the drive shaft. This tilts the thrust vector of the rotor, causing rotorcraft 100 to translate horizontally following the direction the swashplate is tilted.

In the example of FIG. 2, hub 114 may be coupled to drive shaft 112b such that drive shaft 112b transmits torque to hub 114. Hub 114, however, may be moved in a variety of positions relative to drive shaft 112b. For example, pitch links 118 may move hub 114 relative to drive shaft 112b. Moving hub 114 relative to drive shaft 112b may change the angular relationship between hub 114 and drive shaft 112b, which may cause hub 114 and drive shaft 112b to phase shift. Hub 114 and drive shaft 112b may phase shift, for example, if they are not maintained at constant velocity during rotation. Accordingly, teachings of certain embodiments recognize that a constant-velocity (CV) joint may be provided between hub 114 and drive shaft 112b to allow drive shaft 112b to transmit power through a variable angle, at constant speed, without an appreciable increase in friction or play.

In general, a CV joint may refer to a type of mechanism that connects two rotating components making an angle with one another. This angle may vary during service, such as may be the case with the angle between hub 114 and drive shaft 112b. Teachings of certain embodiments recognize that a CV joint may mechanically couple an input shaft to an output shaft in such a way that torque may be transmitted from the input shaft to the output shaft whilst maintaining a substantially CV characteristic. A CV characteristic refers to a characteristic wherein the instantaneous angular velocity of the input shaft is substantially matched to the instantaneous angular velocity of the output shaft throughout a full rotation of the shafts. It is to be understood that the CV characteristic may represent a design goal, and various embodiments may achieve this characteristic to a greater or lesser degree based on parameters, which may include mechanical and structural variations in the assembly. Thus, a joint may maintain a substantially CV characteristic even if the angular velocities do not perfectly match. In some embodiments, a CV joint may maintain a substantially CV characteristic despite variations in angle between the input and output shafts.

Figure 3:
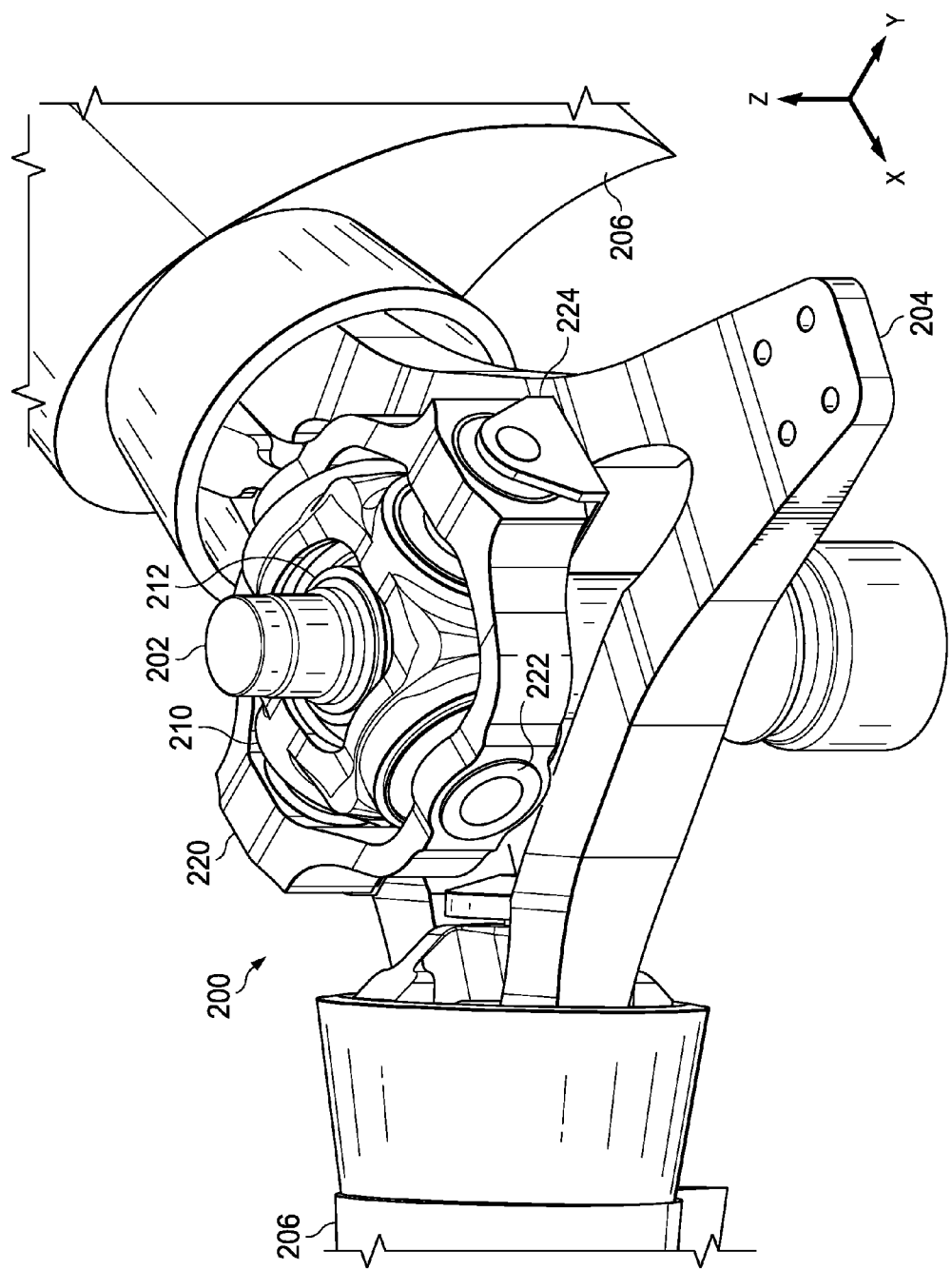
FIG. 3 shows a constant velocity (CV) joint according to one example embodiment.

FIG. 3 shows a CV joint 200 according to one example embodiment. In the example of FIG. 3, CV joint 200 is shown coupling a drive shaft 202 to a hub 204, which features blade portions 206. Drive shaft 202, hub 204, and blade portions 206 may correspond to drive shaft 112b, hub 114, and blades 120 of FIGS. 1 and 2.

CV joint 200 features an inner yoke 210, an outer yoke 220, and elastomeric bearings 230. Teachings of certain embodiments recognize that the torsional spring rates of elastomeric bearings 230, in combination, may provide a control mechanism that maintains a CV characteristic between drive shaft 202 and hub 204.

As shown in FIG. 3, inner yoke 210 is positioned about drive shaft 202. In this example, inner trunion 212 couples inner yoke 210 to drive shaft 202 and allows inner yoke 210 to rotate about a first axis relative to drive shaft 202 and inner trunion 212. As shown in FIG. 3, this first axis of rotation may substantially intersect and/or be substantially normal to the axis of rotation of drive shaft 202.

Teachings of certain embodiments recognize that inner yoke 210 may include an opening for receiving drive shaft 202. In this example, the CV control mechanism is positioned away from the opening through inner yoke 210 so as not to interfere with the opening receiving drive shaft 202. Teachings of certain embodiments recognize that such an arrangement may represent an improvement over CV joints that feature control mechanisms that interfere with the ability to receive a drive shaft through its center.

Outer yoke 220 is positioned about inner yoke 210. In this example, yoke coupler 222 couples outer yoke 220 to inner yoke 210 and allows outer yoke 220 to rotate about a second axis relative to inner yoke 210 and yoke coupler 222. In some embodiments, yoke coupler 222 is positioned inside of respective openings of inner yoke 210 and outer yoke 220 so as to maintain inner yoke 210 and outer yoke 222 as substantially coaxial. As shown in FIG. 3, this second axis of rotation may substantially intersect and/or be substantially normal to the first axis of rotation.

Hub 204 is positioned about drive shaft 202. Hub couplers 224 couple outer yoke 220 to hub 204 and allow outer yoke 220 to rotate about a third axis relative to hub couplers 224 and hub 204. As shown in FIG. 3, this third axis of rotation may substantially intersect and/or be substantially normal to the second axis of rotation.

In some embodiments, CV joint 200 also features three sets of elastomeric bearings 230 comprised of an elastomeric material. An elastomeric material is a material, such as a polymer, having the property of viscoelasticity (colloquially, "elasticity"). Elastomeric materials generally have a low Young's modulus and a high yield strain when compared to other materials. Elastomeric materials are typically thermosets having long polymer chains that cross-link during curing (i.e., vulcanizing).

For example, in some embodiments, an elastomeric bearing 232 may be disposed between inner trunion 212 and inner yoke 210, an elastomeric bearing 234 may be disposed between yoke coupler 222 and inner yoke 210 and/or outer yoke 220, and an elastomeric bearing 236 may be disposed between hub coupler 224 and outer yoke 220. As will be explained in greater detail below, the torsional spring rates of elastomeric bearings 232 and 236, in combination, may provide a control mechanism that maintains a CV characteristic between drive shaft 202 and hub 204. Elastomeric bearings 232 and 236 are shown in greater detail with regard to FIG. 4D and are described in greater detail below.

Figure 4A:
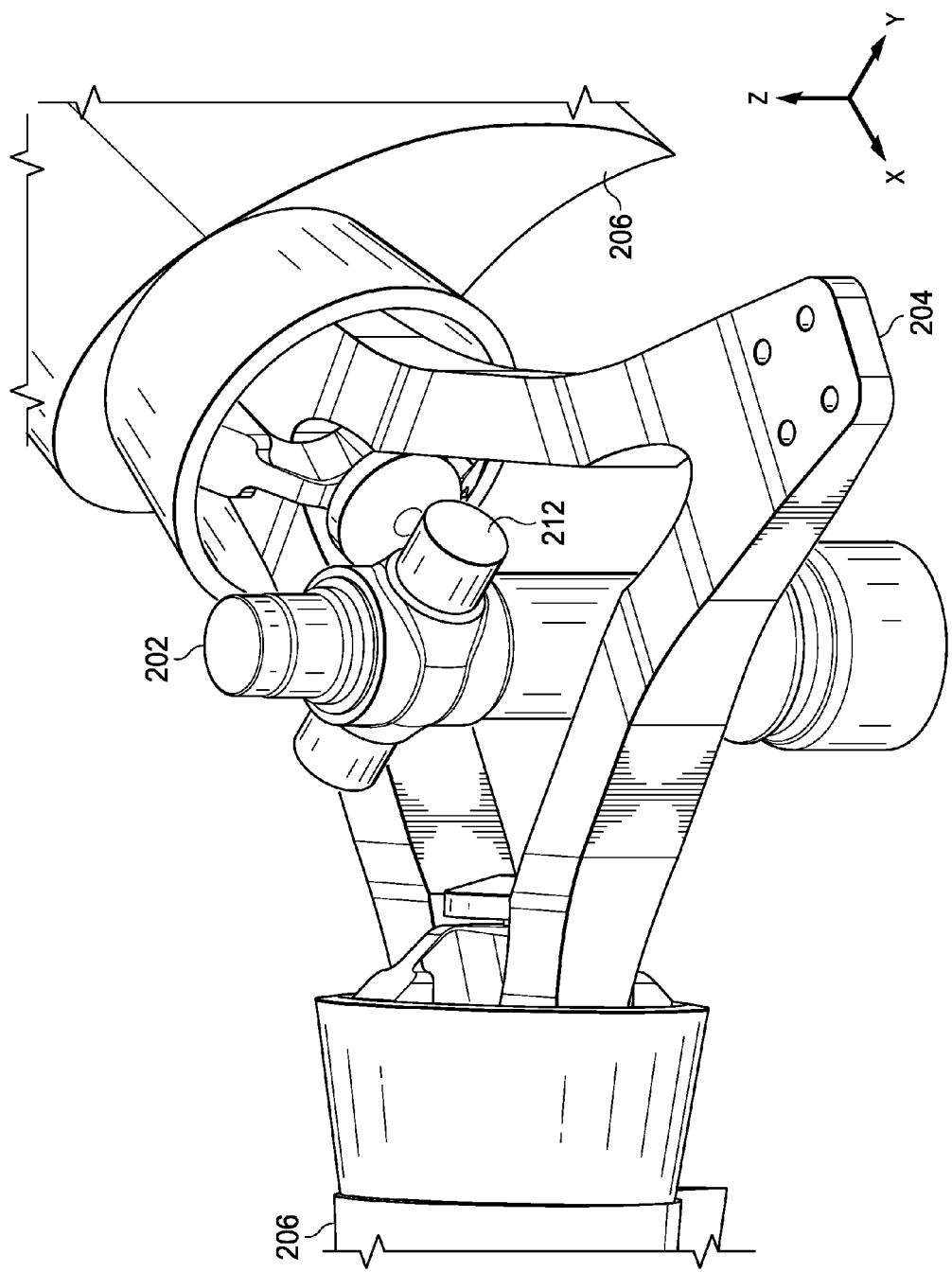
Figure 4B:
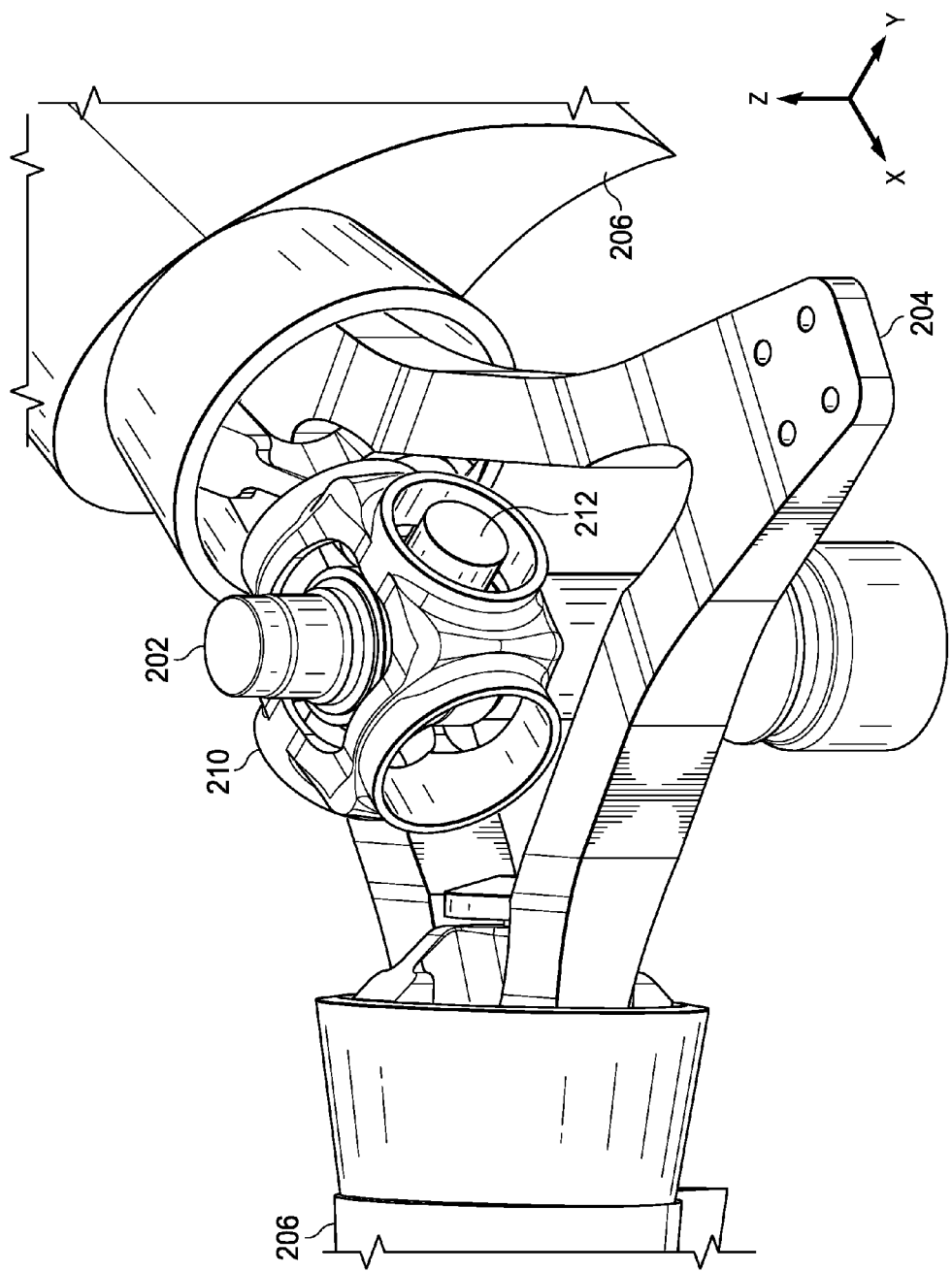

FIGS. 4A-4F show disassembled views of the CV joint 200 of FIG. 3. FIG. 4A shows drive shaft 202 and hub 204 with CV joint 200 removed. As seen in FIG. 4A, inner trunion 212 is positioned around drive shaft 202. In FIG. 4B, inner yoke 210 is positioned around inner trunion 212. Inner trunion 212 includes substantially cylindrical protrusions that allow inner yoke 210 to rotate about inner trunion 212. In this manner, inner trunion 212 may define the first axis of rotation about which inner yoke 210 may rotate. As shown in FIG. 4B, inner yoke 210 includes openings larger than the outer diameters of inner trunion 212 so as to allow room for elastomeric bearing 232.

Figure 4C:
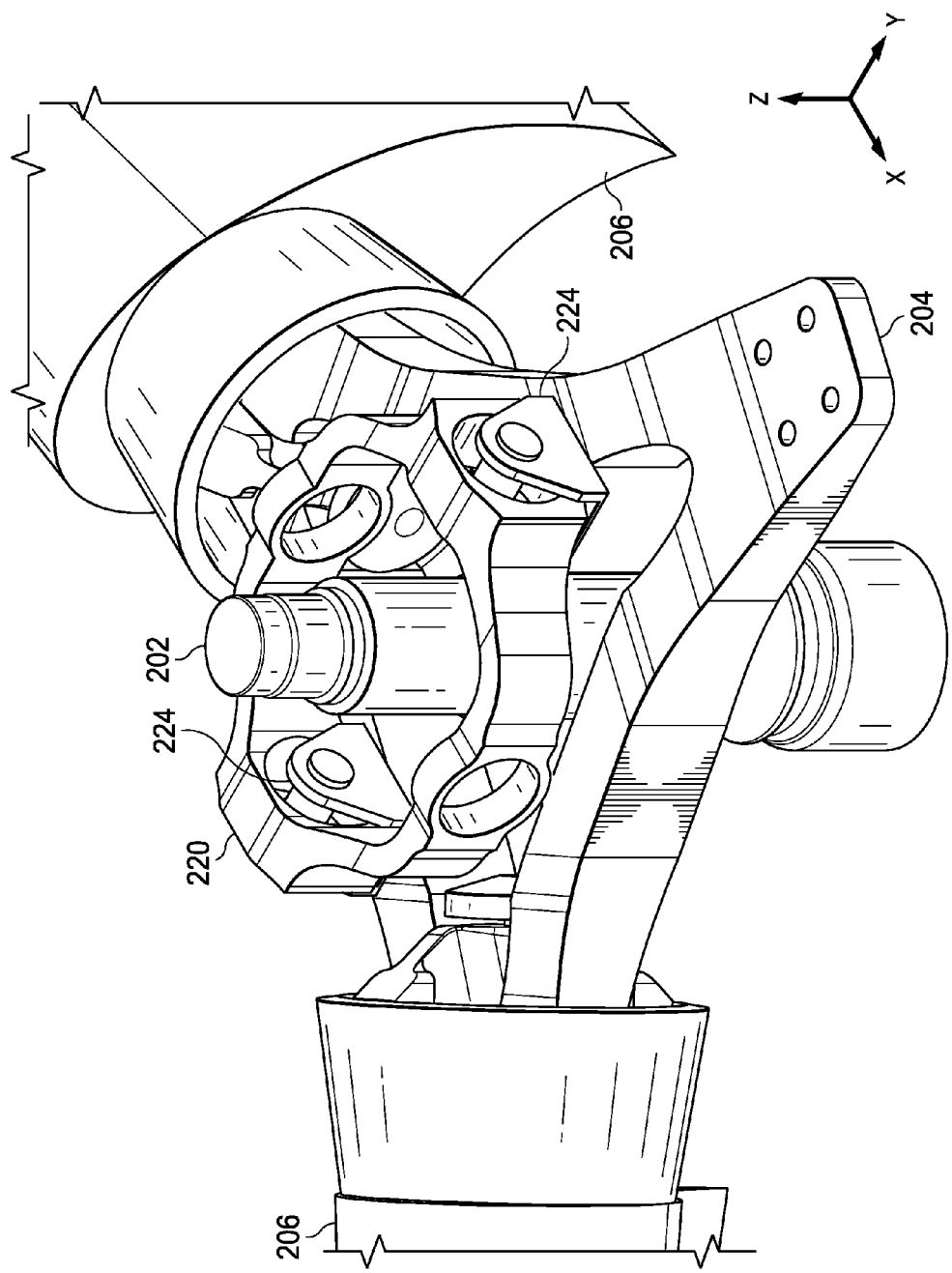

In FIG. 4C, inner yoke 210 and inner trunion 212 are removed, and outer yoke 220 is added. As seen in FIG. 4C, hub couplers 224 couple outer yoke 220 to hub 204. Hub couplers 224 include substantially cylindrical shafts that allow outer yoke 220 to rotate about hub couplers 224. In this manner, hub couplers 224 may define the third axis of rotation about which outer yoke 220 may rotate. As shown in FIG. 4C, outer yoke 220 includes openings larger than the outer diameters of hub couplers 224 so as to allow room for elastomeric bearing 236.

Figure 4D:
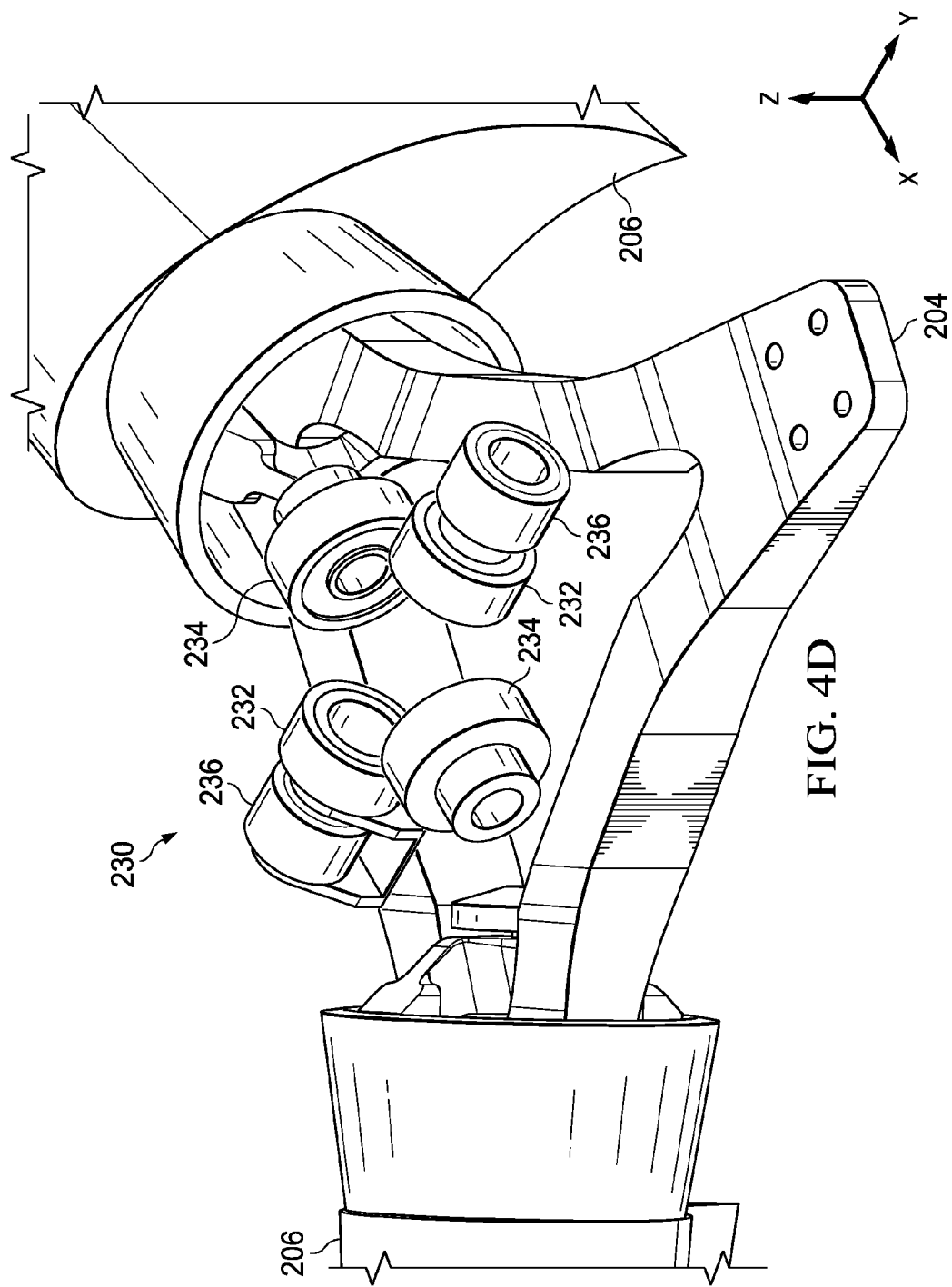

FIG. 4D shows elastomeric bearings 230 with the inner yoke 210 and outer yoke 220 removed. In this example embodiment, an elastomeric bearing 232 may be disposed between inner trunion 212 and inner yoke 210, an elastomeric bearing 234 may be disposed between yoke coupler 222 and inner yoke 210 and/or outer yoke 220, and an elastomeric bearing 236 may be disposed between hub coupler 224 and outer yoke 220.

Figure 4E:
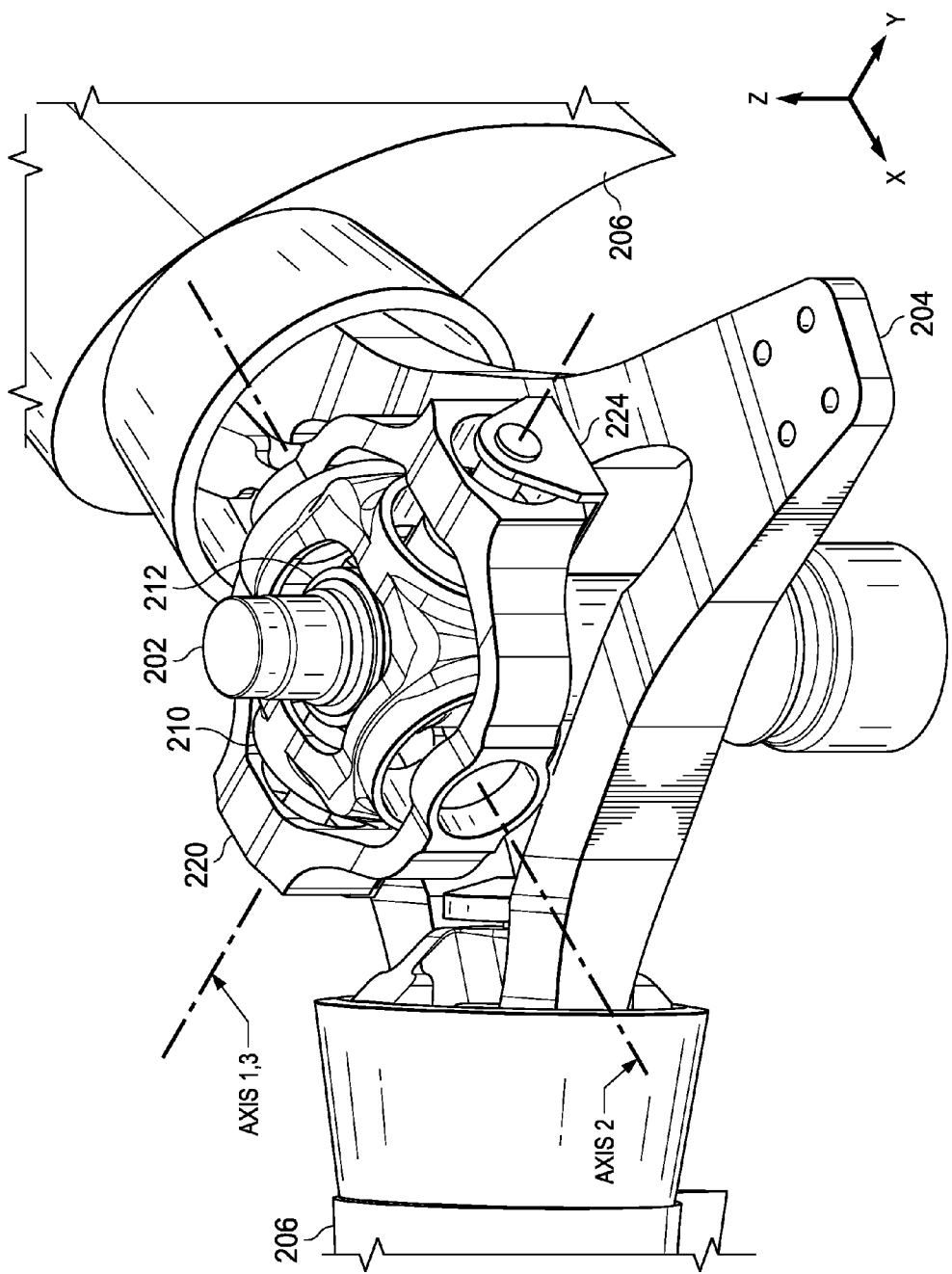

In FIGS. 4E and 4F, both inner yoke 210 and outer yoke 220 are provided, and elastomeric bearings 230 are removed. FIG. 4E shows a perspective view of CV joint 200 without yoke coupler 222, and FIG. 4F shows a top view of CV joint 200 with yoke coupler 222. Teachings of certain embodiments recognize that yoke coupler 222 may be provided to couple inner yoke 210 to outer yoke 220 and to allow inner yoke 210 and outer yoke 220 to rotate about the same second axis.

Even with yoke coupler 222, however, movement of inner yoke 210 and outer yoke 220 may be relatively unconstrained. For example, FIG. 4D shows inner yoke 210 and outer yoke 220 positioned such that the first axis is coaxial with the third axis. In this example, inner yoke 210 and outer yoke 220 are free to rotate about the first and third axes unconstrained. If drive shaft 202 and/or hub 204 are deflected at an angle such that the first axis is no longer coaxial with the third axis, the unconstrained motion of inner yoke 210 and outer yoke 220 may prevent the CV joint from maintaining a CV characteristic. Teachings of certain embodiments recognize, however, that the torsional spring rates of elastomeric bearings 232 and 236, in combination, may provide a CV control mechanism that positions inner yoke 210 and outer yoke 220.

Figure 5B:
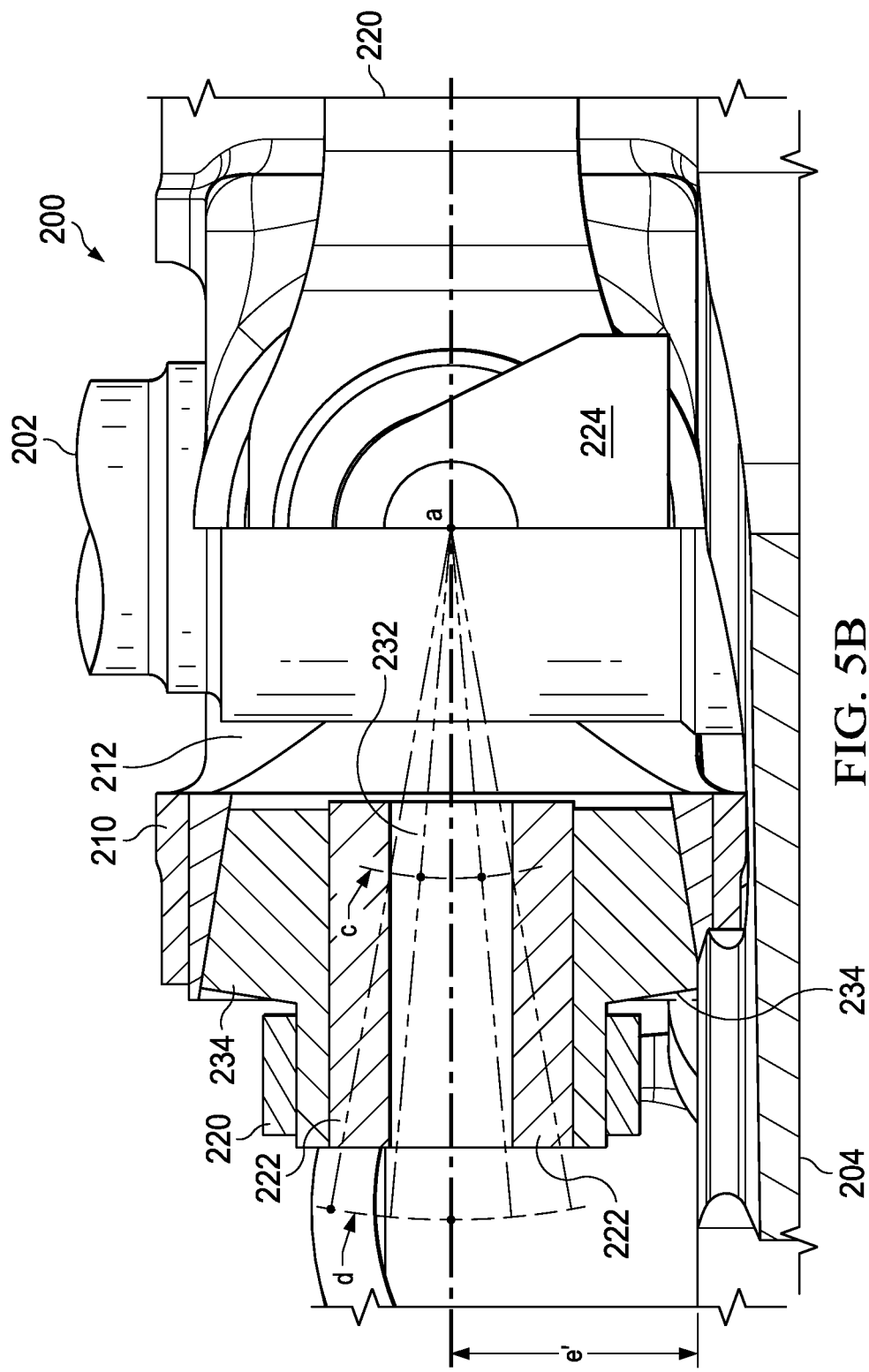
Figure 5D:
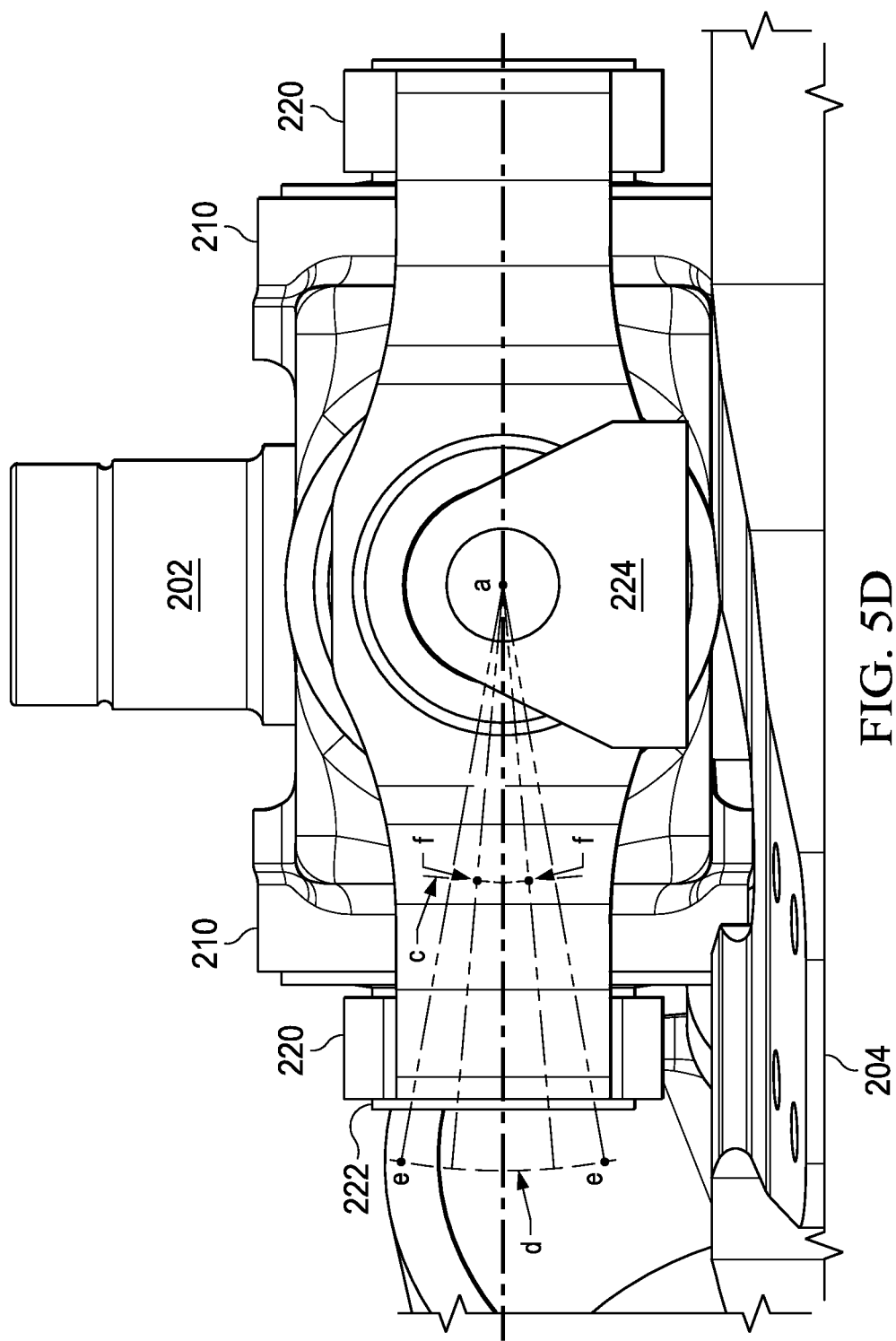

FIGS. 5A-5D show operation of the spring rate CV control mechanism of the CV joint 200 of FIG. 3. FIG. 5A shows a top view, FIG. 5B shows a cross-section side view, FIG. 5C shows the mathematical relationship between various components according to one example embodiment, and FIG. 5D shows a fully-assembled view of the side view of FIG. 5B.

In some embodiments, elastomeric bearings 232 and 236, in combination, may provide a control mechanism that maintains a CV characteristic between drive shaft 202 and hub 204. In particular, the torsional spring rates of elastomeric bearings 232 and 236 may be chosen such that inner yoke 210 is substantially positioned along an angle bisecting the angle between the input and output shafts (e.g., mast 202 and hub 204).

As seen in FIGS. 5B-5D, positions a-f represent various locations within CV joint 200. In this example, origin point a is located at the intersection of the first axis, the second axis, the third axis, and the axis of rotation of drive shaft 202. In some embodiments, origin point may be located at the intersection of more, fewer, or different axes than those identified above. In the example of FIGS. 5B-5D, origin point a is located at the intersection of the first and second axes such that rotation of inner yoke 210 about the first axis results in repositioning of the second axis.

Travel arc c represents a travel path of a reference point f. Point f represents a location of inner yoke 210 (along with yoke coupler 222 and outer yoke 220). In some embodiments, point f may be coaxial with the second axis. Because the second axis also intersects point a, line a-f is may also be coaxial with the second axis. This second axis, as stated above, is an axis of rotation of the outer yoke 220. In the example of FIG. 5B, outer yoke 220, yoke coupler 222, and elastomeric bearing 234 are all approximately centered about the second axis.

Travel arc d represents a travel path of a reference point e. Reference point e indicates a relative position of hub 204. For example, as shown in FIG. 5B, reference point e is a fixed distance e' from hub 204. As hub 204 moves, reference point e moves along travel arc d. Reference point b represents the position of reference point e when the angle between the input and output shafts (e.g., mast 202 and hub 204) is zero degrees. Accordingly, the angle between the input and output shafts may be represented as the angle between lines a-b and lines a-e.

Teachings of certain embodiments recognize that elastomeric bearings 232 and 236 may help maintain a CV characteristic during operation of CV joint 200 by positioning the second axis on the angular bisector for the deflection angle between drive shaft 202 and hub 204 (e.g., the angle between lines a-b and lines a-e) for a range of deflection angles. In the example of FIG. 5C, hub 204 is deflected 10 degrees relative to drive shaft 202. Thus, in this example, hub 204 has moved linkage 240 such that point e is now located at the 10 degree position of travel arc d. Stated another way, the angle between the zero degree reference line a-b and the line between origin point a and point e is 10 degrees.

When hub 204 is deflected 10 degrees relative to mast 202, hub 204 moves hub couplers 224, which repositions outer yoke 220. In response, outer yoke 220 repositions inner yoke 210. This repositioning may cause the second axis (coaxial with line a-f) to move away from the zero degree reference line a-b. If the repositioning of the second axis is not controlled (e.g., if line a-f moves too far away from line a-b), CV joint 200 can vibrate or suffer from high loads due to kinematic error.

To manage the repositioning of the second axis during operation of CV joint 200, elastomeric bearings 232 and 236 manage rotation of inner yoke 210 and outer yoke 230 about the first and third axes, respectively. For example, the torsional spring rate of the elastomeric bearings 232 and 236 may oppose the forces that attempt to rotate the inner yoke 210 and outer yoke 230 about the first and third axes, respectively. Thus, in one example scenario, when hub 204 is rotated X degrees, the spring rates of bearings 232 and 236 may cause inner yoke 210 to rotate X/2 degrees. In the example of FIG. 5C, the torsional spring rate of the elastomeric bearings 232 and 236 oppose the forces that attempt to rotate the inner yoke 210 and outer yoke 230 about the first and third axes, respectively, such that a ten degree difference between mast 202 and hub 204 only results in an approximately five degree deflection of line a-f. Teachings of certain embodiments recognize that CV joint 200 may utilize the spring rates of bearings 232 and 236 to maintain smooth operation of its kinematic linkages through a range of misalignment angles.

As reference point e moves along travel arc d (either increasing or decreasing in angle), reference point f likewise moves along travel arc c (likewise either increasing or decreasing in angle based on the angle associated with point e, but such changes in angle being smaller in magnitude). Teachings of certain embodiments recognize that line a-f may bisect the angle between the 0 degree reference line a-b and line a-e for a range of deflection angles. For example, if the deflection angle is reduced to 6 degrees, then the angle between line a-e and line a-f would be approximately 3 degrees. Accordingly, teachings of certain embodiments recognize the capability of elastomeric bearings 232 and 236 to allow inner yoke 210 and outer yoke 220 to move such that their axis of rotation (the second axis) is positioned in the angular bisector of the deflection angle between drive shaft 202 and hub 204.

Teachings of certain embodiments recognize that positioning inner yoke 210 and outer yoke 220 may allow CV joint 200 to achieve a substantially CV characteristic. In particular, teachings of certain embodiments recognize that center inner yoke 210 and outer yoke 220 along the angular bisector of the cocking angle between drive shaft 202 and hub 204 may allow CV joint 200 to achieve a substantially CV characteristic. In addition, teachings of certain embodiments recognize that elastomeric bearings 230 may position inner yoke 210 and outer yoke 220 while CV joint 200 is at zero cocking angle.

Modifications, additions, or omissions may be made to the systems and apparatuses described herein without departing from the scope of the invention. As one example, the embodiments described and contemplated herein may apply to rotorcraft 100 as well as other rotorcraft or other vehicles, including but not limited to tiltrotor aircraft and tandem main-rotor aircraft. As another example, teachings of certain embodiments may apply to a variety of double U-joint style CV joints whose U-joints are coincident by using spring ate to control the positioning of the coupling housing.

The components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

What is claimed is:

1. A rotorcraft, comprising:
   a body;
   a power train coupled to the body and comprising a power source and a drive shaft coupled to the power source;
   a hub;
   a rotor blade coupled to the hub; and
   a constant velocity (CV) joint coupled between the drive shaft and the hub, the CV joint comprising:
      a first yoke rotatably coupled to the drive shaft about a first axis and configured to receive the drive shaft through a first opening;
      a first bearing disposed about the first axis adjacent to the first yoke;
      a second yoke rotatably coupled to the first yoke about a second axis and rotatably coupled to the hub about a third axis;
      a second bearing disposed about the second axis adjacent to the first yoke or the second yoke; and
      a third bearing disposed about the third axis adjacent to the second yoke, wherein the first and third bearings torsionally constrain movement of the first yoke and the second yoke so as to achieve a substantially CV characteristic between the drive shaft and the hub,
      wherein, when the hub is tilted at a first angle relative to the drive shaft, the first and third bearings are adapted to position the first and second yokes such that the second axis is tilted at a second angle relative to the drive shaft which is smaller in magnitude than the first angle.

2. The rotorcraft of claim 1, wherein at least one of the first bearing, the second bearing, or the third bearing comprise an elastomeric material.

3. The rotorcraft of claim 1, wherein the second yoke is disposed at least partially about the first yoke.

4. The rotorcraft of claim 3, wherein the second yoke is disposed completely about the first yoke.

5. The rotorcraft of claim 1, wherein the hub is disposed about the drive shaft.

6. The rotorcraft of claim 1, wherein the first axis is substantially normal to an axis of rotation of the drive shaft.

7. The rotorcraft of claim 1, wherein the third axis is substantially normal to an axis of rotation of the hub.

8. The rotorcraft of claim 1, wherein the first and third bearings are adapted to position the first and second yokes such that the second axis substantially resides on a bisector of the first angle.

9. The rotorcraft of claim 8, wherein the second bearing is positioned to travel along an arc representing a range of bisection angles.

10. The rotorcraft of claim 1, wherein the second bearing is disposed about the second axis adjacent to the first yoke and the second yoke.

11. The rotorcraft of claim 1, wherein the first and third bearings are operable to torsionally constrain movement of the first yoke and the second yoke when the first and third axes are substantially collinear.

12. The rotorcraft of claim 11, wherein the first and third bearings are operable to position the first and second yokes such that the second axis substantially resides on a bisector of the first angle when the first and third axes are substantially collinear.

13. A method of achieving a substantially constant velocity (CV) characteristic between an input device and an output device, comprising:
   receiving the input device through a first opening in a first yoke, the first yoke rotatably coupled to the input device about a first axis and rotatably coupled directly to a second yoke about a second axis, the second yoke rotatably coupled to the output device about a third axis; and
   constraining rotation of the first yoke about the first axis and rotation of the second yoke about the third axis so as to achieve a substantially CV characteristic between the input device and the output device.

14. The method claim 13, wherein constraining rotation of the first yoke and the second yoke comprises constraining an orientation of the second axis.

15. A constant velocity (CV) joint comprising:
   a first yoke configured to be rotatably coupled to an input device about a first axis and configured to receive the input device through a first opening;
   a first bearing disposed about the first axis adjacent to the first yoke;
   a second yoke rotatably coupled to the first yoke about a second axis and rotatably coupled to an output device about a third axis;
   a second bearing disposed about the second axis adjacent to the first yoke or the second yoke; and
   a third bearing disposed about the third axis adjacent to the second yoke, wherein the first and third bearings torsionally constrain movement of the first yoke and the second yoke so as to achieve a substantially CV characteristic between the input device and the output device,
   wherein, when the output device is tilted at a first angle relative to the input device, the first and third bearings are adapted to position the first and second yokes such that the second axis is tilted at a second angle relative to the input device which is smaller in magnitude than the first angle.

16. The CV joint of claim 15, wherein the second yoke is disposed at least partially about the first yoke.

17. The CV joint of claim 16, wherein the second yoke is disposed completely about the first yoke.

18. The CV joint of claim 15, wherein the first and third bearings are adapted to position the first and second yokes such that the second axis substantially resides on a bisector of the first angle.

19. The CV joint of claim 18, wherein the second bearing is positioned to travel along an arc representing a range of bisection angles.

* * * * *